US005160657A

United States Patent [19]

Bortolotti et al.

[11] Patent Number: 5,160,657

[45] **Date of Patent: * Nov. 3, 1992**

[54] DETERGENT COMPOSITIONS AND PROCESS FOR PREPARING THEM

[75] Inventors: Fabrizio Bortolotti, Piacenza; Luciano Pietrantoni, Somaglia, both of Italy; Petrus L. J. Swinkels, Vlarrdingen; Marco Waas, Rotterdam, both of Netherlands

[73] Assignee: Lever Brothers Company, Division of Conopo, Inc., New York, N.Y.

[*] Notice: The portion of the term of this patent subsequent to Jul. 28, 2009 has been disclaimed.

[21] Appl. No.: 495,549

[22] Filed: Mar. 19, 1990

[30] Foreign Application Priority Data

Mar. 17, 1989 [GB] United Kingdom ................. 8907187

[51] Int. Cl.[5] ........................ C11D 11/00; C11D 3/10; C11D 3/12; B29C 67/00

[52] U.S. Cl. ............................... 252/174.14; 252/174; 252/174.13; 252/174.25; 252/DIG. 6; 264/117

[58] Field of Search ............... 264/117; 252/89.1, 174, 252/174.25, 135, DIG. 6, 174.13, 174.14

[56] References Cited

U.S. PATENT DOCUMENTS

| | | | |
|---|---|---|---|
| 4,372,868 | 2/1983 | Saran | 252/174 |
| 4,587,031 | 5/1986 | Kruse | 252/174 |
| 4,828,721 | 5/1989 | Bollier | 252/174 |
| 4,846,409 | 7/1989 | Kaspar et al. | 241/21 |
| 4,869,843 | 9/1989 | Saito | 252/174 |
| 4,925,585 | 5/1990 | Strauss | 252/89.1 |

FOREIGN PATENT DOCUMENTS

| | | |
|---|---|---|
| 0219328 | 4/1987 | European Pat. Off. . |
| 0229671 | 7/1987 | European Pat. Off. . |
| 0264049 | 10/1987 | European Pat. Off. . |
| 2913145 | 10/1980 | Fed. Rep. of Germany . |
| 61-069897 | 9/1984 | Japan . |
| 1517713 | 7/1978 | United Kingdom . |

OTHER PUBLICATIONS

English translation of DE 2,913,145, Oct. 1980.
English Language Translation of Japanese 63/99296, Apr. 30, 1988.
British Search Report-Free of Citations, May 17, 1989.
Brochure-Lodige Recycler.

*Primary Examiner*—A. Lionel Clingman
*Assistant Examiner*—Erin M. Higgins
*Attorney, Agent, or Firm*—James J. Farrell

[57] ABSTRACT

In a process for preparing a granular detergent composition or component having a bulk density of at least 650 g/l, which comprises the steps of treating a particulate starting material (i) in a first step in a high-speed mixer/densifier, the mean residence time being from about 5–30 seconds;
(ii) in a second step in a moderate-speed granulator/-densifier, whereby it is brought into, or maintained in, a deformable state, the mean residence time being from about 1–10 minutes and
(iii) in a final step in drying and/or cooling apparatus, the amount of oversize particles can be effectively reduced by adding 0.1 to 40% by weight of a powder in the second step or between the first and the second step. Preferably, the deformable state is induced in the first step.

11 Claims, No Drawings

DETERGENT COMPOSITIONS AND PROCESS FOR PREPARING THEM

TECHNICAL FIELD

The present invention relates to a process for the preparation of a granular detergent composition or component having a high bulk density and good powder properties. More in particular, it relates to a process for the continuous preparation of such detergent compositions. Moreover, it relates to a granular detergent composition obtainable by the process of the present invention.

BACKGROUND AND PRIOR ART

Recently there has been considerable interest within the detergents industry in the production of detergent powders having a relatively high bulk density, for example 600 g/l and above.

Generally speaking, there are two main types of processes by which detergent powders can be prepared. The first type of process involves spray-drying an aqueous detergent slurry in a spray-drying tower. In the second type of process, the various components are dry-mixed and optionally agglomerated with liquids, e.g. nonionics.

The most important factor which governs the bulk density of a detergent powder is the bulk density of the starting materials in the case of a dry-mixing process, or the chemical composition of the slurry in the case of a spray-drying process. Both factors can only be varied within a limited range. For example, one can increase the bulk density of a dry-mixed powder by increasing its content of relatively dense sodium sulphate, but the latter does not contribute to the detergency of the powder, so that its overall properties as a washing powder will generally be adversely affected.

Therefore, a substantial increase in bulk density can only be achieved by additional processing steps which lead to densification of the detergent powders. There are several processes known in the art leading to such densification. Particular attention has thereby been paid to the densification of spray-dried powders by post-tower treatment.

In our co-pending European patent application 89202706.1 a process for the continuous preparation of a granular detergent composition or component having a bulk density of at least 650 g/l is described. This process comprises the steps of treating a particulate starting material (i) in a first step in a high-speed mixer/densifier, the mean residence time being from about 5-30 seconds;

(ii) in a second step in a moderate-speed granulator/-densifier, whereby it is brought into, or maintained in, a deformable state, the mean residence time being from about 1-10 minutes and (iii) in a final step in a drying and/or cooling apparatus.

Preferably, the particulate starting material is already brought into, or maintained in, a deformable state in the first step.

The advantages of the process described above are the fact that it can be carried out in a continuous way and that it is relatively flexible with respect to the composition of the starting materials.

Essential for the process is the deformable state—to be defined hereafter—into which the particulate starting material must be brought. This can be induced in a number of ways, for instance by operating at temperatures above 45° C. and/or adding liquids to the particulate starting material.

Optimal densification results are obtained when the starting material is very deformable. However, when processing very deformable powders, complications may arise with regard to the particle size distribution of the final product. More in particular, a considerable production of oversize particles was observed. This was found to be especially the case when using starting materials which have a high active content, i.e. a content of anionic and/or nonionic surfactants of 20% by weight or more of the starting material.

It is therefore an object of the present invention to provide an improved continuous process of the above-mentioned kind for obtaining high bulk density detergent compositions, or components thereof, having a bulk density of at least 650 g/l.

We have now found that a substantial improvement with regard to the particle size distribution can be achieved when 0.1 to 40% by weight of a powder is added in the second step or between the first and the second step. In carrying out this improved process, the particle porosity, which may be in the order of 20–70% for a spray-dried base powder, is successfully reduced to, or kept at, values of less than 10%, preferably less than 5%. At the same time, the production of "oversize" particles is kept within acceptable limits.

JP-A-63/099296 (LION) discloses a process for manufacturing a granular detergent material wherein the formation of fine powder and coarse grains is suppressed by spraying 7–15% by weight of water and nonionic surfactant as a liquid binder system on to the base powder, followed by admixing 10–25% by weight of a water-insoluble, fine powder, such as a zeolite, in a granulator.

DEFINITION OF THE INVENTION

In a first aspect, the present invention provides a process for the continuous preparation of a granular detergent composition or component having a bulk density of at least 650 g/l, which comprises the steps of treating a particulate starting material (i) in a first step in a high-speed mixer/densifier, the mean residence time being from about 5-30 seconds;

(ii) in a second step in a moderate-speed granulator/-densifier, whereby it is brought into, or maintained in, a deformable state, the mean residence time being from about 1-10 minutes and (iii) in a final step in a drying and/or cooling apparatus, characterized in that 0.1 to 40%, preferably 0.5 to 10% by weight, of a powder is added in the second step or between the first and the second step. It is preferred when the powder has a particle size of 2 to 50, especially from 2 to 10 μm. The process is particularly useful for processing powders having a high active content of more than 20 or even 30% by weight.

The particulate starting material is preferably already brought into, or maintained in, a deformable state in the first step.

In a second aspect, the present invention provides a granular detergent composition obtainable by the process of the invention, said composition having a particle porosity of less than 10%, preferably less than 5%.

DETAILED DESCRIPTION OF THE INVENTION

In the process of the present invention, a particulate starting material is treated in a two-step densification process to increase its bulk density to values of at least 650 kg/l.

The particulate starting material may be prepared by any suitable method, such as spray-drying or dry-mixing. It comprises the compounds usually found in detergent compositions such as detergent active materials (surfactants) and builders.

The detergent active material may be selected from anionic, ampholytic, zwitterionic or nonionic detergent active materials or mixtures thereof. Particularly preferred are mixtures of anionic with nonionic detergent active materials such as a mixture of an alkali metal salt of an alkyl benzene sulphonate together with an alkoxylated alcohol.

The preferred detergent compounds which can be used are synthetic anionic and nonionic compounds. The former are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher ($C_8$–$C_{18}$) alcohols, produced for example from tallow or coconut oil, sodium and potassium alkyl ($C_9$–$C_{20}$) benzene sulphonates, particularly sodium linear secondary alkyl ($C_{10}$–$C_{15}$) benzene sulphonates; and sodium alkyl glyceryl ether sulphates, especially those ethers of the higher alcohols derived from tallow or coconut oil and synthetic alcohols derived from petroleum. The preferred anionic detergent compounds are sodium ($C_{11}$–$C_{15}$) alkyl benzene sulphonates and sodium ($C_{16}$–$C_{18}$) alkyl sulphates.

Suitable nonionic detergent compounds which may be used include, in particular, the reaction products of compounds having a hydrophobic group and a reactive hydrogen atom, for example, aliphatic alcohols, acids, amides or alkyl phenols with alkylene oxides, especially ethylene oxide either alone or with propylene oxide. Specific nonionic detergent compounds are alkyl ($C_6$–$C_{22}$) phenols-ethylene oxide condensates, generally 5 to 25 EO, i.e. 5 to 25 units of ethylene oxide per molecule, and the condensation products of aliphatic ($C_8$–$C_{18}$) primary or secondary linear or branched alcohols with ethylene oxide, generally 5 to 40 EO.

Mixtures of detergent compounds, for example, mixed anionic or mixed anionic and nonionic compounds, may be used in the detergent compositions, particularly in the latter case to provide controlled low sudsing properties. This is beneficial for compositions intended for use in suds-intolerant automatic washing machines.

Amounts of amphoteric or zwitterionic detergent compounds can also be used in the compositions of the invention but this in not normally desired owing to their relatively high cost.

The detergency builder may be any material capable of reducing the level of free calcium ions in the wash liquor and will preferably provide the composition with other beneficial properties such as the generation of an alkaline pH, the suspension of soil removed from the fabric and the suspension of the fabric-softening clay material. The level of the detergency builder may be from 10% to 70% by weight, most preferably from 25% to 50% by weight.

Examples of detergency builders include precipitating builders such as the alkali metal carbonates, bicarbonates, orthophosphates, sequestering builders such as the alkali metal tripolyphosphates or nitrilotriacetates, or ion exchange builders such as the amorphous alkali metal aluminosilicates or the zeolites.

The process of the present invention is very flexible with respect to the chemical composition of the starting material. Phosphate-containing as well as zeolite-containing compositions and compositions having either a low or a high active content may be used. The process is also suitable for densifying calcite/carbonate-containing detergent compositions.

It was found to be essential to obtain an optimal densification to subject the particulate starting material to a two-step densification process. The first step is carried out in a high-speed mixer/densifier, preferably under conditions whereby the starting material is brought into, or maintained in, a deformable state, to be defined hereafter. As a high-speed mixer/densifier we advantageously used the Lödige (Trade Mark) CB 30 Recycler. This apparatus essentially consists of a large, static hollow cylinder and a rotating shaft in the middle. The shaft has several different types of blades mounted thereon. It can be rotated at speeds between 100 and 2500 rpm, dependent on the degree of densification and the particle size desired. The blades on the shaft provide a thorough mixing action of the solids and the liquids which may be admixed at this stage. The mean residence time of the powder in this apparatus is somewhat dependent on the rotational speed of the shaft, the position of the blades and the weir at the exit opening. It is also possible to add solid material in the Lödige Recycler.

Other types of high-speed mixers/densifiers having a comparable effect on detergent powders can also be contemplated. For instance, a Shugi (Trade Mark) Granulator or a Drais (Trade Mark) K-TTP 80 could be used.

In order to obtain densification of the detergent starting material, it proved to be advantageous that the starting material is brought into, or maintained in, a deformable state, to be defined hereafter. The high-speed mixer/granulator is then able to effectively deform the particulate material in such a way that the particle porosity is considerably reduced or kept at a low level, and consequently the bulk density is increased.

If a dry-mixed powder is used as the particulate starting material, it generally already has a low particle porosity; so its bulk density can, in general, hardly be increased by reducing the particle porosity. However, the processing techniques known in the art commonly provide a processing step wherein additional components, such as nonionics, are added to the dry-mixed starting material, and thereby the particle porosity is usually increased owing to the formation of porous agglomerates. The process of the present invention is therefore also beneficial in such cases.

If a spray-dried powder is used as the particulate starting material, the particle porosity is considerable and a large increase in bulk density can be obtained by the process of this invention.

In this first step of the process according to the invention, the particulate starting material is thoroughly mixed in a high-speed mixer/densifier for a relatively short time of about 5–30 seconds.

After the first processing step, the particle porosity of the detergent material may still be considerable. Instead of selecting a longer residence time in the high-speed mixer to obtain a further bulk density increase, the process of the present invention provides a second processing step in which the detergent material is treated in a moderate-speed mixer/densifier, whereby the mean residence time is from about one to ten minutes, and preferably from 2–5 minutes. During this second processing step, the conditions are such that the powder is brought into, or maintained in, a deformable state. As a consequence, the particle porosity will be further reduced. The main differences with the first step reside in the lower mixing speed and the longer residence time of 1–10 minutes.

The second processing step can be successfully carried out in a Lödige (Trade Mark) KM 300 mixer, also referred to as Lödige Ploughshare. This apparatus essentially consists of a hollow static cylinder having a rotating shaft in the middle. On this shaft various plough-shaped blades are mounted. It can be rotated at a speed of 40–160 rpm. Optionally, one or more high-speed cutters can be used to prevent excessive agglomeration. Another suitable machine for this step is, for example, the Drais (Trade Mark) K-T 160.

In the second step or between the first and the second step 0.1 to 40% by weight of a powder is added in the process. Preferably, 0.5 to 10% by weight is used. The powder may be soluble or dispersible and has a mean particle size of 2 to 50 $\mu$m, preferably of 2 to 10 $\mu$m. Preferred examples of suitable powders are fine zeolite powder (e.g. zeolite A4 having a particle size of 4 $\mu$m), carbonate (having a particle size of 40 $\mu$m) and amorphous calcium silicate, such as Hubersorb (R) 600 having a particle size of 3.2 $\mu$m) ex Huber Corporation.

It is believed that the addition of the powder prevents or reduces the production of oversize particles, i.e. particles having a diameter of more than 1900 $\mu$m, by reducing the stickiness of the detergent powder while it is in a deformable state. As an additional feature of the present invention, the particle size of the detergent composition can be controlled by varying the amount of added powder. It was found that the particle size tends to decrease with increasing amounts of powder, while at smaller amounts of powder an increase of the average particle size is observed.

Another advantage of the method of the present invention is that the storage stability of the final detergent powder is improved. This can be measured by means of the Unconfined Compressibility Test. In this test the detergent powder is placed in a cylinder having a diameter of 13 cm and a height of 15 cm. Subsequently, a weight of 10 kg is placed on top of the powder. After 5 minutes the weight is removed and the walls of the cylinder are taken away. Then an increasing load is placed on top of the column of compressed detergent powder and the weight (in kg) is determined at which the column disintegrates. This value is a function of the stickiness of the detergent powder and proved to be a good measure for the storage stability.

A further advantage of the present process resides in the fact that the flexibility with regard to the properties of the particulate starting material is improved. In particular, the moisture content of a spray-dried starting material does not have to be kept within the same strict limits as without applying the process of the invention.

Essential for the second step and preferred for the first step is the deformable state into which the detergent powder must be brought in order to get optimal densification. The high-speed mixer/granulator and the moderate-speed mixer/densifier are then able to effectively deform the particulate material in such a way that the particle porosity is considerably reduced or kept at a low level, and consequently the bulk density is increased.

This deformable state may be induced in a number of ways, for instance by operating at temperatures above 45° C. When liquids such as water or nonionics are added to the particulate starting material, lower temperatures may be employed, for example 35° C. and above.

According to a preferred embodiment of the present invention, a spray-dried base powder leaving the tower at a temperature of above 45° C. is fed directly into the process of the present invention.

Alternatively, the spray-dried powder may be cooled first, e.g. in an airlift, and subsequently be heated again after transportation. The heat may be applied externally, possibly supplemented by internally generated heat, such as heat of hydration of water-free sodium tripolyphosphate.

The deformability of a detergent powder can be derived from its compression modulus, which in turn can be derived from its stress-strain characteristics. To determine the compression modulus of a specific composition and moisture content, a sample of the composition is compressed to form an airless prill of 13 mm diameter and height. Using an Instron testing machine, the stress-strain diagram during unconfined compression is recorded at a constant strain rate of 10 mm/min. The compression modulus can now be derived from the slope of the stress—versus relative strain diagram during the first part of the compression process, which reflects the elastic deformation. The compression modulus is expressed in MPa. In order to measure the compression modulus at various temperatures, the Instron apparatus can be equipped with a heatable sample holder.

The compression modulus as measured according to the above method was found to correlate well with the particle porosity decrease and the accompanying bulk density increase, under comparable processing conditions. This is further illustrated in the Examples.

As a general rule, the powder can be considered in a deformable state if the compression modulus as defined above is less than approximately 25, preferably less than 20 MPa. Even more preferably, the compression modulus is less than 15 MPa and values of less than 10 MPa are particularly preferred.

The particle porosity can be measured by Hg-porosimetry and the moisture content was determined by the weight loss of a sample at 135° C. after 4 hours.

The deformability of a powder depends, among other things, on the chemical composition, the temperature and the moisture content. As to the chemical composition, the liquids to solids ratio and the amount of polymer proved to be important factors. Moreover, it was generally more difficult to bring phosphate-containing powders into a deformable state than it was for zeolite-containing powders.

For use, handling and storage, the detergent powder must obviously no longer be in a deformable state. Therefore, in a final processing step according to the present invention, the densified powder is dried and/or cooled. This step can be carried out in a known manner, for instance in a fluid bed apparatus (drying) or in an airlift (cooling). From a processing point of view, it is advantageous if the powder needs a cooling step only, because the required equipment is relatively simple.

The densified powder thus obtained may be used as a detergent powder in its own right. Generally, however, various additional ingredients may be added to give a more efficient product. The amount of postdosed material will generally be from about 10 to 200% by weight, calculated on the weight of the densified base powder.

Some materials may be postdosed to a spray-dried densified powder because they are sensitive to heat and thus unsuitable for undergoing spray-drying. Examples of such materials include enzymes, bleaches, bleach precursors, bleach stabilisers, lather suppressors, perfumes and dyes. Liquid or pasty ingredients may conveniently be absorbed on to solid porous particles, generally inorganic, which may then be postdosed to the densified powder obtained by the process of the invention.

The process of the invention is further illustrated by the following non-limiting Examples, in which parts and percentages are by weight unless otherwise indicated. In the Examples the following abbreviations are used:

| | |
|---|---|
| ABS: | Alkyl benzene sulphonate, sodium salt of alkyl benzene sulphonic acid, Dobanoic acid ex Shell |
| NI: | Nonionic surfactant (ethoxylated alcohol), Synperonic A3 or A7 (3 or 7EO groups, respectively) ex ICI |
| Carbonate: | Sodium carbonate |
| Silicate: | Sodium alkaline silicate |
| Zeolite: | Zeolite A4 (Wessalith [Trade Mark] ex Degussa) |
| Polymer: | CP5, a copolymer of maleic and acrylic acid having a molecular weight of 70,000 ex BASF. |

EXAMPLES 1-3

The following zeolite-containing detergent powders were prepared by spray-drying aqueous slurries The compositions (in % by weight) of the powders thus obtained are shown in Table 1.

TABLE 1

| Examples | 1 | 2 | 3 |
|---|---|---|---|
| ABS | 15.1 | 15.4 | 15.4 |
| NI.7EO | 6.6 | 6.6 | 6.8 |
| Zeolite | 49.2 | 49.2 | 46.7 |
| Carbonate | 4.9 | 4.9 | 5.0 |
| Polymer | 8.2 | 8.2 | 8.3 |
| Minors | 1.8 | 1.8 | 1.9 |
| Water | 14.2 | 14.2 | 15.9 |

The powders were produced at a rate between 750 and 1000 kg/hr and had a temperature at tower base of about 60° C. The physical properties of the spray-dried powders are given in Table 2.

TABLE 2

| Examples | 1 | 2 | 3 |
|---|---|---|---|
| Bulk density [kg/m$^3$] | 542 | 504 | 527 |
| Particle porosity [%] | 33 | 32 | 34 |
| Moisture content [%] | 14.2 | 14.2 | 15.9 |
| Particle size [μm] | 403 | 506 | 532 |

The powders were fed directly into a Lödige (Trade Mark) Recycler CB30, a continuous high speed mixer/densifier, which was described above in more detail. The rotational speed was in all cases 1600 rpm. The mean residence time of the powder in the Lödige Recycler was approximately 10 seconds. In this apparatus, various solids and/or liquids were added as indicated in Table 3. Processing conditions and properties of the powder after leaving the Lödige Recycler are given in Table 3.

TABLE 3

| Examples | 1 | 2 | 3 |
|---|---|---|---|
| Powder temperature (°C.) | 61 | 63 | 65 |
| addition of: | | | |
| Carbonate | 8.0 | 5.3 | 8.0 |
| NI.3EO | 6.3 | 6.3 | 6.3 |
| Bulk density [kg/m$^3$] | 724 | 765 | 731 |
| Particle porosity [%] | 17 | 15 | 17 |
| Moisture content [%] | 13.7 | 13.4 | 13.2 |
| Particle size [μm] | 397 | 483 | 417 |
| Modulus [MPa] at 60° C. | 7 | 7 | 7 |

In all cases, the bulk density of the powders was significantly increased. After leaving the Lödige Recycler, the powder was fed into a Lödige (Trade Mark) KM 300 Ploughshare mixer, a continuous moderate-speed granulator/densifier described above in more detail. The rotational speed was 120 rpm and the cutters were used. In this apparatus carbonate powder having a particle size of 40 μm or zeolite powder having a particle size of 4 μm was added, as indicated in Table 4. The mean residence time of the powder in this apparatus was about 3 minutes. The processing conditions and properties of the powder after leaving the Lödige Ploughshare mixer are given in Table 4.

TABLE 4

| Examples | 1 | 2 | 3 |
|---|---|---|---|
| Temperature [°C.] | 53 | 56 | 54 |
| Addition of: | | | |
| Carbonate | 0 | 2 | 0 |
| Zeolite A4 | 0 | 0 | 2 |
| Bulk density [kg/m$^3$] | 893 | 898 | 897 |
| Particle porosity [%] | 2 | 0 | 1 |
| Moisture content [%] | 13.3 | 13.2 | 13.3 |
| Particle size [μm] | 613 | 561 | 534 |

After leaving the Ploughshare granulator/densifier, the bulk density of the powder was very high. In order to obtain the final powder, a cooling step was needed which was carried out in an airlift. The resulting properties of the powder after cooling are given in Table 5.

TABLE 5

| Examples | 1 | 2 | 3 |
|---|---|---|---|
| Bulk density [kg/m$^3$] | 891 | 927 | 927 |
| Dynamic flow rate [ml/s] | 105 | 101 | 102 |
| Unconfined Compressibility Test [kg] | 1.5 | 1.0 | 0.5 |
| Particle porosity [%] | 2 | 0 | 1 |
| Moisture content [%] | 12.3 | 12.6 | 13.2 |
| Particle size [μm] | 603 | 557 | 521% |
| Oversize [>900 μm] | 9 | 4 | 2 |

Finally, about 70 parts of the obtained powders were supplemented with 20 parts perborate monohydrate bleach particles, 4 parts TAED bleach activator, 3 parts antifoam granules, and 0.5 parts proteolytic enzyme, to formulate high bulk density fabric washing powders which all had a good wash performance.

We claim:

1. Process for the continuous preparation of a granular detergent composition or component having a bulk density of at least 650 g/l, which comprises:

(i) in a first step mixing a particulate starting material having one or more detergent active materials and one or more builders in a high-speed mixer/densifier, the mean residence time being from about 5-30 seconds to obtain a powder;

(ii) in a second step mixing said powder in a moderate-speed granulator/densifier, said powder thereby being brought into, or maintained in, a deformable state, said mixing of the powder in said deformable state reducing the intraparticle porosity of said powder, the mean residence time being from about 1-10 minutes and;

(iii) in a final step drying and/or cooling said powder, whereby 0.1 to 40% by weight of a second powder is added in the second step or between the first and the second step, said second powder having a particle size of 2 to 50 μm and being selected from the group consisting of fine zeolite powder, sodium carbonate and amorphous calcium silicate.

2. Process according to claim 1, wherein 0.5 to 10% by weight of a second powder is added.

3. Process according to claim 1, wherein the second powder has a particle size of 2 to 10 μm.

4. Process according to claim 1, wherein the detergent composition in the second step contains more than 20% actives.

5. Process according to claim 1, wherein the detergent composition in the second step contains more than 30% actives.

6. Process according to claim 1, wherein the particulate starting material is already brought into, or maintained in, a deformable state in the first step.

7. Process according to claim 1, wherein the deformable state is brought about by operating at temperatures above 45° C. and/or adding liquid to the particulate starting material.

8. Process according to claim 1, wherein nonionics, anionics, silicate and/or water are sprayed on to the particulate starting material during the first step.

9. Process according to claim 1, wherein the particulate starting material comprises a mixture of spray-dried material and other solids.

10. Process according to claim 1, wherein the particulate starting material is a spray-dried detergent powder.

11. Process according to claim 1, wherein the particle porosity of the final granular detergent product is less than 10%.

* * * * *